US008537099B2

(12) United States Patent
Aioanei

(10) Patent No.: US 8,537,099 B2
(45) Date of Patent: Sep. 17, 2013

(54) DYNAMIC VOLTAGE SUPPLY FOR LCD TIMING CONTROLLER

(75) Inventor: Ovidiu Aioanei, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 486 days.

(21) Appl. No.: 12/877,246

(22) Filed: Sep. 8, 2010

(65) Prior Publication Data

US 2012/0056864 A1 Mar. 8, 2012

(51) Int. Cl.
*G09G 3/36* (2006.01)
*G09G 3/32* (2006.01)
*G06F 3/038* (2013.01)

(52) U.S. Cl.
USPC .............................. 345/102; 345/82; 345/212

(58) Field of Classification Search
USPC ............................ 345/212, 102, 82, 213, 323
See application file for complete search history.

(56) References Cited

U.S. PATENT DOCUMENTS

2007/0097067 A1* 5/2007 Yoo .............................. 345/102
2007/0195025 A1* 8/2007 Korcharz et al. ............... 345/82
2010/0156879 A1* 6/2010 Hong et al. .................. 345/213

* cited by examiner

*Primary Examiner* — James Wozniak
*Assistant Examiner* — Kuo Woo
(74) *Attorney, Agent, or Firm* — Osha Liang LLP

(57) ABSTRACT

An integrated circuit voltage supply circuitry for liquid crystal display and a method are disclosed. The voltage supply comprises a DC voltage regulator having a reference voltage input and a feedback voltage input; a positive voltage pin and a negative voltage pin providing power to the DC voltage regulator; a network of resistors comprising a plurality of parallel branches, each branch having at least one resistor and one node; a plurality of LCD modules supported by the DC voltage regulator, each module connecting to the node of each parallel branch; a plurality of diodes each formed between the node of one module and a feedback diode; and the feedback diode connected to the feedback voltage input of the DC voltage regulator, wherein the DC voltage regulator keeps the voltage for each LCD module not lower than the reference voltage, regardless of each module's consumption of current.

18 Claims, 3 Drawing Sheets

DYNAMIC VOLTAGE SUPPLY FOR LCD TIMING CONTROLLER

TECHNICAL FIELD

The present invention relates to power electronics integrated circuitry, in particular, to systems and methods for integration of power management circuitry and timing controller for LCD applications.

DISCUSSION OF RELATED ART

The use of active liquid-crystal display (LCD) panels has increased at a fast pace in the last decade. The panel's size extends from only a couple of inches for a handheld device to tens of inches for a HDTV display. The multimedia phenomenon has become part of everybody's daily life, and with that there is need for innovative displays able to deliver the content to various market segments. Generally, an active matrix flat panel display includes a LCD screen containing a plurality of pixels for displaying images, a backlight, a timing controller for the driving circuits to control display signals, and a power management circuitry for the backlight. The LCD panel displays the images by controlling the luminance of each pixel according to given display information. Each pixel of the active light-emitting device includes a light-emitting element, a driving transistor for driving it, a switching transistor for applying a data voltage to the driving transistor, and a capacitor for storing the data voltage. The driving transistor outputs a current which has a magnitude depending on the data voltage. The light-emitting device emits light having intensity depending on the output current of the driving transistor, thereby displaying images.

Optimizing power consumption of an LCD display has been a long-standing consideration in the design of LCD electronic products, especially for battery dependent mobile display devices. Proper management of power consumption in display panels is imperative for achieving energy efficiency and better battery life.

Therefore, there is a need to develop a truly integrated time controlled power delivery system for LCD panels.

SUMMARY

Therefore, there is a need to develop a truly integrated time controlled power delivery system for LCD panels. Consistent with some disclosed embodiments, an integrated circuit voltage supply for liquid crystal display (LCD) is disclosed. In some embodiments, an IC voltage supply for an LCD can include a DC voltage regulator coupled between a positive voltage and a negative voltage, the DC regulator receiving a reference voltage and a feedback voltage and providing an output voltage; a resistor network that includes a plurality of parallel branches, each branch having at least one resistor and one node, coupled to the output voltage of the DC voltage regulator; an LCD module coupled to each of the nodes of each parallel branch; and a plurality of diodes each disposed between the node of each branch and a common feedback diode, the common feedback diode coupled to provide the reference voltage, wherein the DC voltage regulator keeps the feedback voltage from each LCD module not lower than the reference voltage independently of each module's consumption of current.

Consistent with the disclosed embodiments, an IC multiple voltage supply system for LCD is described, the multiple voltage supply comprises a timing controller controlling image data scanning timing on LCD; a digital-to-analog converter (DAC) outputting a plurality of reference voltages; a plurality of IC voltage supplies, each IC voltage supply including a DC voltage regulator having one reference voltage input from the DAC reference voltages and a feedback voltage input; a positive voltage pin and a negative voltage pin providing power to the DC voltage regulator; a network of resistors comprising a plurality of parallel branches, each branch having at least one resistor and one node; a plurality of LCD modules supported by the DC voltage regulator, each module connecting to the node of each parallel branch; a plurality of diodes each formed between the node of one module and a feedback diode; and the feedback diode connected to the feedback voltage input of the DC voltage regulator, wherein the DC voltage regulator keeps the voltage for each LCD module not lower than the reference voltage, regardless of each module's consumption of current.

Consistent with the disclosed embodiments, a method of managing a voltage supply for an LCD display is disclosed. The method includes: providing a DC voltage regulator; supplying a reference voltage input signal to the first input terminal of the DC voltage regulator; connecting a plurality of LCD modules in parallel on the output of the DC voltage regulator; and connecting a plurality of diodes each between at least one LCD module and the second input terminal of the DC voltage regulator, wherein the diodes provide a feedback voltage input for the DC voltage regulator.

Consistent with the disclosed embodiments, a method of managing a multiple voltage supply for an LCD display includes: providing a timing controller and outputting to a digital-analog-converter (DAC); generating a plurality of reference voltage signals from the DAC; providing a plurality of DC voltage regulators, each DC voltage regulator comprising; applying one of the plurality of reference voltage signals to a first input terminal of the DC voltage regulator; connecting a plurality of LCD modules in parallel to the output of the DC voltage regulator; and connecting a plurality of diodes each between at least one LCD module and a second input terminal of the DC voltage regulator, wherein the diodes provide a feedback voltage input for the DC voltage regulator.

These and other embodiments are further discussed below with respect to the following figures.

BRIEF DESCRIPTION OF THE DRAWINGS

Some embodiments of the present invention will be described more fully below with reference to the accompanying drawings. This invention may, however, be embodied in many different forms and should not be construed as being limited to the embodiments set forth herein.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other material that, although not specifically described here, is within the scope and the spirit of this disclosure.

The following description provides details for a thorough understanding of the present invention. Though, several typical circuits are employed to describe certain aspects of the present invention, it should not limit the present invention to these typical circuits. Those circuits which are obvious to those skilled in the art may be omitted although they are implemented in the present invention. In other instances, the well-known circuits may be shown in block diagram form in order not to obscure the present invention in unnecessary detail.

Figure 1:
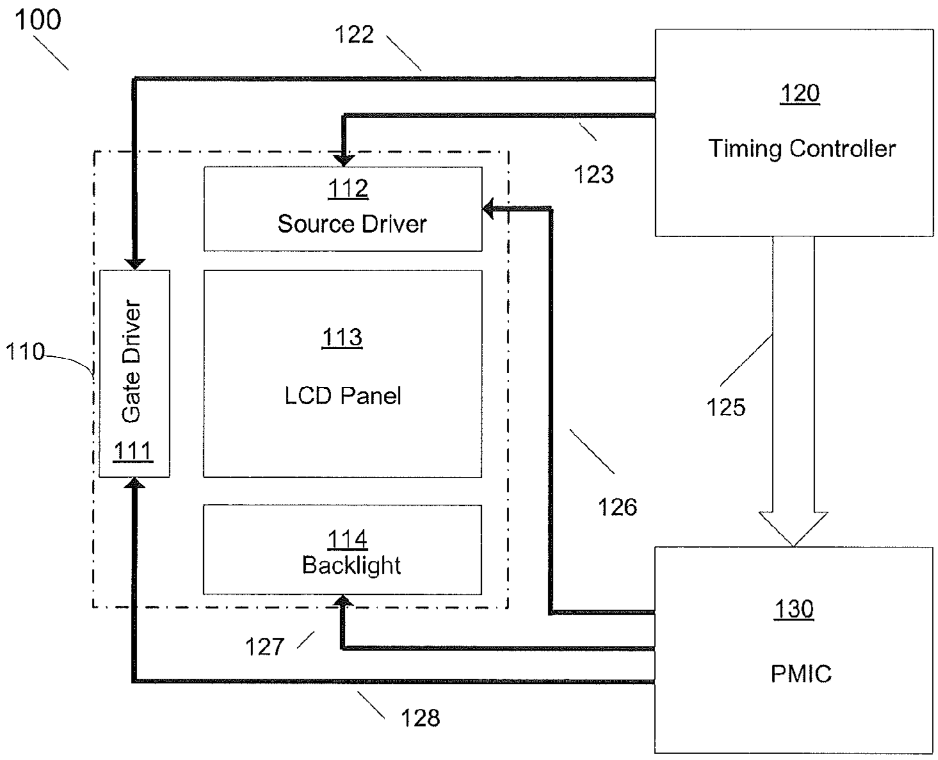
FIG. 1 illustrates a standard block diagram of a LCD panel electronics system.

FIG. 1 illustrates a standard block diagram of a LCD display system 100. System 100 includes several discrete entities: an LCD unit 110, a timing controller 120, and a power management unit 130. The LCD unit 110 contains a gate drive 111, a source driver 112, a LCD display device 113, and a backlight 114.

A backlight such as backlight 114 is a form of illumination used in LCD systems such as system 100. Backlight 114 illuminates LCD panel 113 from the side or back of the display panel, unlike frontlights which are placed in front of a LCD panel. Backlights such as backlight 114 are often used in monitor displays or laptop displays to produce light in a manner similar to a CRT display. More recently, light-emitting-diodes are applied as backlights for mobile devices, such as handheld PCs, laptops, or cell phones.

Simple types of LCD displays are built without an internal light source, requiring external light sources to convey the display image to the user. Modern LCD screens, however, typically include an internal light source. Such LCD screens consist of several layers. Backlight 114 is usually the first layer from the back. In order to create screen images, backlight 114 can include a mechanism to regulate the light intensity of the screen's pixels. For this purpose, timed light valves that vary the amount of light reaching the target by blocking its passage in some way can be used. The most common such element is a polarizing filter to polarize light from the source in one of two transverse directions and then to pass it through a switching polarizing filter, to block the path of undesirable light.

As shown in FIG. 1, Timing Controller 120 commands the precise image display timing by sending a gate timing signal 122 to Gate Driver 111 and a source timing signal 123 to Source Driver 112. Gate Driver 111 and Source Driver 112 enable the image display as a pixel matrix in LCD screen 113. Power management integrated circuit (PMIC) 130 provides adequate source voltages 126 to Source Driver 112 and gate voltages 128 to Gate Driver 111. In addition, PMIC provides to backlight 114 a dimming signal 127, which keeps the right balance between the backlight illumination intensity and energy conservation. Since light-emitting-diodes (LEDs) are widely used in recently built low power consumption mobile devices, PMIC typically provides backlight 114 with a LED dimming control signal using an advanced technique such as, for example, a pulse-width-modulation technique.

Pulse-width modulation (PWM) is a very efficient way of providing intermediate amounts of electrical power between fully-on and fully-off. As comparison, a simple power switch with a typical power source provides full power only when switched on. PWM works well with digital controls, which can easily set the needed duty cycles because of their on/off nature. PWM can be used to reduce the total amount of power delivered to a load without losses normally incurred when a power source is limited by resistive means. This is because the average power delivered is proportional to the modulation duty cycle. With a sufficiently high modulation rate, passive electronic filters can be used to smooth the pulse train and recover an average analog waveform. PWM is also often used to control the supply of electrical power to another device such as in brightness control of light sources and in many other power electronics applications.

However, in a standard LCD panel, the interaction between the discrete Timing Controller 120 and PMIC 130 is generally limited to discrete handshakes, such as an enable signal, and for example, the LED dimming control is often provided by a PWM signal. Therefore, in a conventional LCD panel, image timing control and panel illumination power management are integrated as discrete circuits, leaving the system bulky and energy inefficient.

A more efficient integration would be an integration of these two functions, power management and timing controller, in a single-chip solution. When integrated with the PMIC, the timing controller 120 is able to dynamically adjust its power supply based on a number of system inputs on the same chip, improving the overall performance of the LCD system. The present invention discloses a method for the timing controller to dynamically adjust its power supply based on system inputs when integrated with the PMIC.

Figure 2:
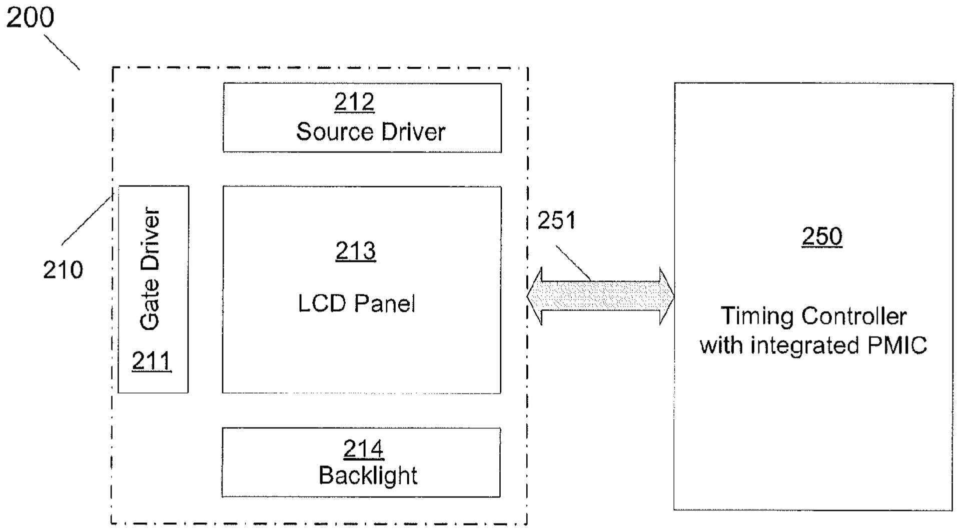
FIG. 2 shows a block diagram of an LCD panel system consistent with some embodiments of the present invention.

FIG. 2 is a schematic block diagram of an LCD panel system 200 consistent with some embodiments of the present invention. LCD unit 210 is controlled by a single unit integrating a timing controller and a power management function to achieve better performance.

In FIG. 2, an LCD control system 200 includes an LCD unit 210, which includes a gate driver 211, a source driver 212, an LCD panel 213, and a backlight 214. An integrated Timing Controller and PMIC 250, which sends integrated power pulses 251 to Source Driver 212, Gate driver 211, and Backlight 214 in the LCD unit 210.

Figure 3:
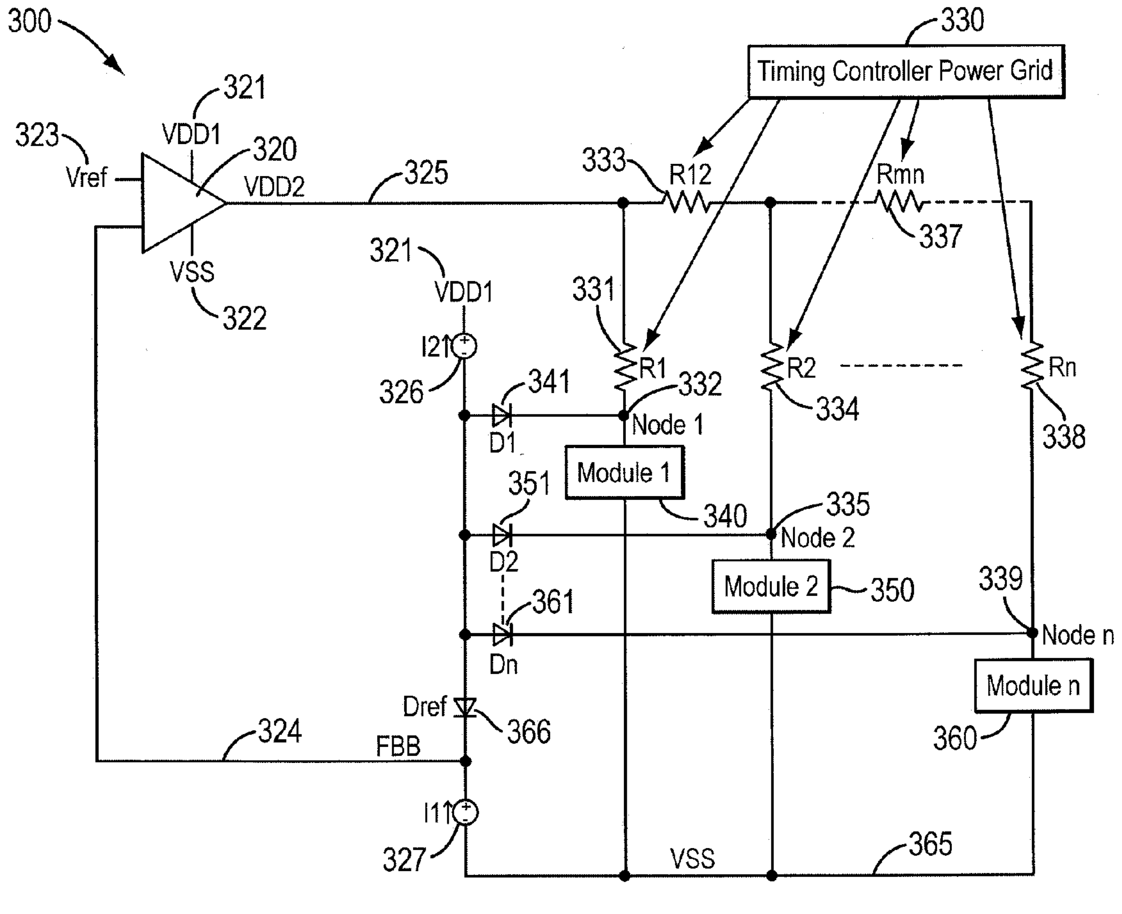
FIG. 3 illustrates an exemplary dynamic voltage supply circuitry according to an embodiment of the present invention.

FIG. 3 illustrates an exemplary dynamic voltage supply circuitry 300 according to some embodiments of the present invention. A Timing Controller Power Grid and multiple feedback points in combination with a DC-DC voltage regulator provides a sufficient and efficient voltage for each LCD module.

In FIG. 3, a DC-DC regulator 320 is coupled between a positive power rail VDD1 321 and a negative power rail VSS 322. DC-DC regulator 320 inputs a reference voltage 323 and a feedback voltage FBB 324. The reference voltage 323 can be internally fixed or can be adjusted on the fly based on some predetermined conditions. DC-DC regulator 320 outputs output voltage VDD2 325, which provides support power for timing controller 330. Regulator 320 dynamically adjusts the output voltage VDD2 325 for the timing controller 330 such that the feedback voltage FBB 324 equals reference voltage 323.

DC-DC regulator 320 can be a linear voltage regulator or a switching voltage regulator. A voltage regulator is an electrical regulator designed to automatically maintain a constant voltage level. All active modern electronic voltage regulators operate by comparing the actual output voltage to some internal fixed reference voltage. Any difference is amplified and used to control the regulation element in such a way as to reduce the voltage error. Active regulators, including linear and switched regulators, employ at least one active (amplifying) component such as a transistor or operational amplifier. A linear regulator maintains the desired output voltage by dissipating excess power in ohmic losses (e.g., in a resistor or in the collector-emitter region of a pass transistor in its active mode). A linear regulator regulates either output voltage or current by dissipating the excess electric power in the form of heat, and hence its maximum power efficiency is voltage-out/voltage-in since the volt difference is wasted. In contrast, a switched-mode power supply regulates either output voltage or current by switching ideal storage elements, like inductors and capacitors, into and out of different electrical configurations. Ideal switching elements (e.g., transistors operated outside of their active mode) have no resistance when "closed" and carry no current when "open", and so the converters can theoretically operate with 100% efficiency, i.e. all input power is delivered to the load; no power is wasted as dissipated heat. The duty cycle of the switch sets how much charge is transferred to the load. This is controlled by a similar feedback mechanism as in a linear regulator. Switching regulators are also able to generate output voltages which are higher than the input, or of opposite polarity—something not possible with a linear design. Switching regulators are used as replacements for the linear regulators when higher efficiency, smaller size or lighter weight is required. Therefore, switched regulators have found broad applications in personal computers, laptops and mobile device chargers.

The present invention applies to any type of voltage conversion including but not limited to switching and linear regulators. The timing controller 300 controls several LCD modules represented in FIG. 3 by Module 1 340, Module 2 350, through Module n 360. Modules 340, 350, and 360 can be any module in the circuits, for example the LVDS module and the Digital Core module. Each of modules 340, 350 and 360 is powered from the supply voltage VDD2 325 through a Timing Controller Power Grid 330 represented by resistors R1 331, R2 334, R12 333, through resistors Rn 338 and Rmn 337, which form a number of parallel resistance branches. Each branch supports one of modules 340, 350, and 360. For example, resistor R1 331 and Module 1 340 form the first branch, R2 334, R12 333, and Module 2 340 form the second branch, resistors Rmn 337, Rn 338, and Module n 360 form the nth branch.

A Node point in each branch is located between the module and its closest resistor. For example, Node 332 is set between R1 331 and Module 1 340, Node 335 is set between R2 334 and Module 2 350, and Node 339 is set between Rn 338 and Module n 360. Resistors 331, 333, 334, 337, and 338 can be made of elemental Ohmic resistors or can be formed from parasitic metal resistances associated with process metal layers at the integrated circuits chip level. The voltage dropout across each Ohmic resistor or a layer of parasitic metal resistance is proportional to the current consumed by each relevant module. The current amount in each module varies according to the timing controller mode of operation; therefore some modules may actually be supplied with a voltage less than required if the DC-DC regulator 320 utilizes only one feedback point.

A multiple feedback system is formed of a number of diodes D1-Dn 341, 351, . . . , 361 and a reference diode Dref 366, coupled together at the same terminal, for example, the anode as shown in FIG. 3. The other terminals of diodes D1-Dn 341, 351, . . . , 361 each couple to the node points in each branch. For example, the cathode of diode D1 341 connects to Node 1 332, the cathode of diode D2 351 is coupled to Node 2 335, and the cathode of diode Dn 361 is coupled to Node n 339. The anodes of the diodes are coupled to the positive power rail VDD1 321 and the cathode of the reference diode Dref 366 is coupled to a feedback voltage signal FBB 324, which is used as the feedback voltage input to the DC-DC regulator. Diodes are biased through I1 327 and I2 326 such that the voltage at node 1 332, node 2 335, through node n 339 is no less than the reference voltage Vref 323. The feedback voltage FBB 324 always follows the lowest node voltage among all node points. The DC-DC regulator 321 dynamically adjusts its output voltage 325 to make sure that the lowest node voltage among all branches, therefore the feedback signal FBB 324, is not lower than the internally fixed reference voltage Vref 323, regardless of the current consumption of each module. The currents I1 327 and I2 326 can be in any relationship for example, I2=2×I1 if all diodes are of the same type and size.

Figure 4:
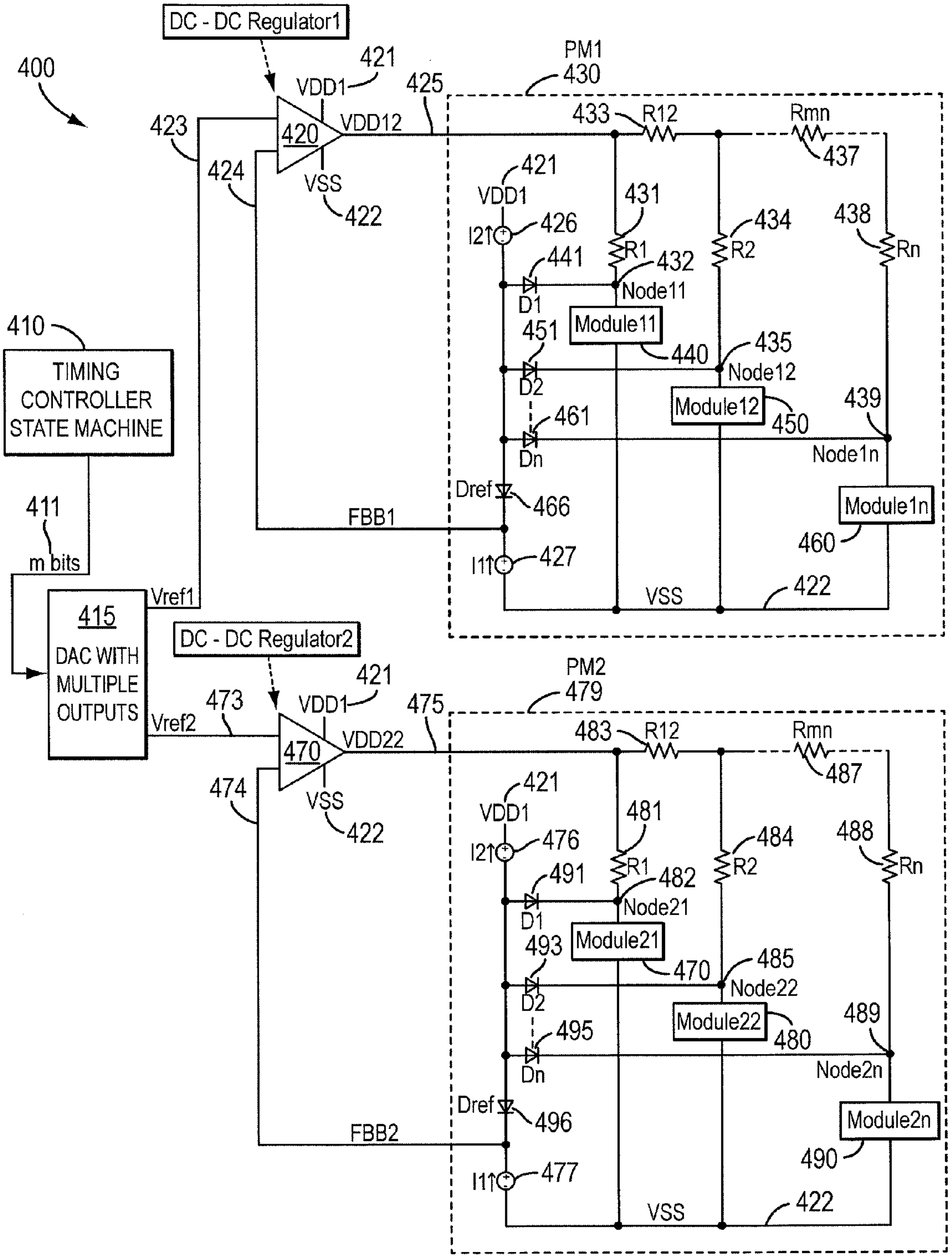
FIG. 4 shows another exemplary dynamic voltage supply circuitry having two power managed systems consistent with some embodiments of the present invention.

FIG. 4 shows another exemplary circuitry of dynamic voltage supply having more than one regulated power managed systems, consistent with some embodiment of the present invention.

System 400 shown in FIG. 4 includes two power managed systems for simplicity, but can include any number of power managed systems. Consequently, each power managed system can be independently powered from its own DC-DC regulator with the multiple feedback network connected to a number of power managed systems, as illustrated in FIG. 4. The timing controller state machine 410 provides an m-bit logic input 411 to a digital-to-analog converter (DAC) 415, which generates analog voltage references 423 and 473 for DC-DC regulators 420 and 470. Both DC-DC regulators 420 and 470 are coupled between positive power rail VDD1 421 and negative power rail VSS 422. DAC 415 is capable of generating more than two analog reference voltages for more than two DC-DC regulators in a multiple power managed system.

A state machine, also called a finite-state machine or finite-state automaton, is a mathematical abstraction or a behavior model that is composed of a finite number of states, forming a bit number. A state machine is often used to design digital logic or computer programs, to solve a large number of problems, among which electronic design automation, communication protocol design, parsing and other engineering applications. In a digital circuit, a state machine can be built using a programmable logic device, a programmable logic controller, logic gates and flip flops or relays.

Power management systems in diagram 400 of FIG. 4 is similar to diagram 300 in FIG. 3, each containing a DC-DC regulator, a power grid, and a multiple feedback points.

Each power grid 430 or 479 includes several LCD modules. The first power grid 430 includes Module 11 440, Module 12 450, through Module 1*n* 460. Each of modules 450 through 460 is powered by the supply voltage VDD12 425 through a power grid PM1 430 represented by resistors R1 431, R2 434, R12 433, through resistor Rn 438 and Rmn 437, which form a number of parallel resistance branches. Each branch supports one module. For example, resistor R1 431 and Module 11 440 form the first branch, R2 434, R12 433, and Module 12 440 form the second branch, resistors Rmn 437, Rn 438, and Module in 460 form the nth branch. A Node point in each branch is located between the module and its closes resistor. For example, Node 432 is set between R1 431 and Module 1 440, Node 435 is set between R2 434 and Module 2 450, and Node 439 is set between Rn 438 and Module n 460. Resistors 431, 433, 434, 437, and 438 can be made of elemental Ohm resistors or can be formed from parasitic metal resistances associated with the process metal layers. The voltage dropout across each elemental Ohmic resistor or parasitic metal resistance is proportional to the current consumed by each relevant module. A multiple feedback system is formed of a number of diodes D1-Dn 441, 451, . . . , 461 and a reference diode Dref 466, coupled together at the same terminal, for example, the anode. The other terminals of diodes D1-Dn 441, 451, . . . , 461 each couple to the node points in each branch. For example, the cathode of diode D1 441 is coupled to Node 1 432, the cathode of diode D2 451 is coupled to Node 2 435, and the cathode of diode Dn 461 is coupled to Node n 439. The anodes of the diodes are coupled to the positive power rail VDD1 421 and the cathode of the reference diode Dref 466 is coupled to a feedback voltage signal FBB 424, which is used as the feedback voltage input to the DC-DC regulator. Diodes are biased through I1 427 and I2 426 such that the voltage at node 1 432, node 2 435, through node n 439 is no less than the reference voltage Vref1 423. The feedback voltage FBB 1 424 always follows the lowest node voltage among all node points. The DC-DC regulator 420 dynamically adjusts its output voltage VDD12 425 to make sure that the lowest node voltage among all branches, therefore the feedback signal FBB1 424, is not lower than the internally fixed reference voltage Vref1 423, regardless of the current consumption of each module. The currents I1 427 and I2 426 can be in any relationship for example, I2=2×I1 if all diodes are of the same type and size. Thus, power grid PM1 430 can adjust its power supply VDD12 425 on the fly according to an algorithm based on the modes of operation. A stand-by state for this system 430 is determined by the Timing Controller State Machine 410 and enabled by the converted reference voltage Vref1 423, therefore the power supply voltage VDD12 425 is adjust to a minimum to reduce the power consumption.

The second power managed system, formed by DC-DC regulator 470 and power grid PM2 479, functions similarly to the first power managed system, formed by DC-DC regulator 420 and power grid PM1 430. Second power grid 479 includes Module 21 470, Module 22 480, through Module **2*n* 490. Each module is powered by the supply voltage VDD12 475 through a power grid PM2 430 represented by resistors R1 481, R2 484, R12 483, through resistor Rn 488 and Rmn 487, which form a number of parallel resistance branches. Each branch supports one module. For example, resistors R1 481 and Module 21 470 forms the first branch, R2 484, R12 483, and Module 22 480 form the second branch, resistors Rmn 487, Rn 488, and Module 2*n* 490 form the nth branch. A Node point in each branch is located between the module and its closes resistor. For example, Node 482 is set between R1 481 and Module 21 470, Node 485 is set between R2 484 and Module 22 480, and Node 489 is set between Rn 488 and Module 2*n* 490. Resistors 481, 483, 484, 487, and 488 can be elemental Ohm resistors or can be formed as parasitic metal resistances associated with the process metal layers. The voltage dropout across each elemental Ohmic resistor or parasitic metal resistance is proportional to the current consumed by each relevant module. A multiple feedback system is formed of a number of diodes D1-Dn 491, 493, . . . , 495 and a reference diode Dref 496, coupled together at the same terminal, for example, the anode. The other terminals of diodes D1-Dn 491, 493, . . . , 495 each are coupled to the node points in each branch. For example, the cathode of diode D1 491 is coupled to Node 1 482, the cathode of diode D2 493 is coupled to Node 2 485, and the cathode of diode Dn 495 is coupled to Node n 489. The anodes of the diodes are coupled to the positive power rail VDD1 421 and the cathode of the reference diode Dref 496 is coupled to a feedback voltage signal FBB 474, which is used as the feedback voltage input to the DC-DC regulator. Diodes are biased through I1 477 and I2 476 such that the voltage at node 1 482, node 2 485, through node n 489 is no less than the reference voltage Vref2 473. The feedback voltage FBB2 474 always follows the lowest node voltage among all node points. The DC-DC regulator 470 dynamically adjusts its output voltage FDD22 475 to make sure that the lowest node voltage among all branches, therefore the feedback signal FBB2 474, is not lower than the internally fixed reference voltage Vref2 473, regardless of the current consumption of each module. The currents I1 477 and I2 476 can be in any relationship for example, I2=2×I1 if all diodes are of same type and size. Thus, power grid PM2 479 can adjust its power supply VDD22 475 on the fly according to an algorithm based on the modes of operation. A stand-by state for this system 479 is determined by the Timing Controller State Machine 410 and enabled by the converted reference voltage Vref2 473, therefore the power supply voltage VDD22 475** is adjusted to a minimum to reduce the power consumption.

As discussed above, system 400 can include any number of power managed systems. Each of the power managed systems can be as described above.

The above detailed description of integrated timing controller and voltage supply is provided to illustrate specific embodiments of the present invention and is not intended to be limiting. Numerous variations and modifications within the scope of the present invention are possible. The present invention is set forth in the following claims.

What is claimed is:

1. An IC voltage supply for LCD, the voltage supply comprises:

a DC voltage regulator coupled between a positive voltage and a negative voltage, the DC regulator receiving a reference voltage and a feedback voltage and providing an output voltage;

a resistor network that includes a plurality of parallel branches, each branch having at least one resistor and one node, coupled to the output voltage of the DC voltage regulator;

an LCD module coupled to each of the nodes of each parallel branch; and a plurality of diodes each comprising an anode and each disposed between the node of each branch and a common feedback diode, the common feedback diode comprising an anode coupled to the anodes of the plurality of diodes and the common feedback diode coupled to provide the feedback voltage, wherein the DC voltage regulator keeps the feedback voltage from each LCD module not lower than the reference voltage independently of each module's consumption of current.

2. An IC voltage supply for LCD in claim 1, wherein the voltage supply is in a single chip.

3. An IC voltage supply for LCD in claim 1, wherein the network of resistors is formed of parasitic resistance.

4. An IC voltage supply for LCD in claim 1, wherein the DC voltage regulator is a linear voltage regulator.

5. An IC voltage supply for LCD in claim 1, wherein the DC voltage regulator is a switching voltage regulator.

6. An IC voltage supply for LCD in claim 1, the reference voltage input for the DC voltage regulator is an analog timing signal.

7. An IC voltage supply for LCD in claim 1, wherein the reference voltage input is internally fixed.

8. An IC multiple voltage supply system for LCD, comprising:

a timing controller controlling image data scanning timing on LCD;

a digital-to-analog converter (DAC) outputting a plurality of reference voltages;

a plurality of IC voltage supplies, each IC voltage supply including:

a DC voltage regulator coupled between a positive voltage and a negative voltage, the DC regulator receiving a reference voltage of the plurality of reference voltages and a feedback voltage and providing an output voltage;

a resistor network that includes a plurality of parallel branches, each branch having at least one resistor and one node, coupled to the output voltage of the DC voltage regulator;

an LCD module coupled to each of the nodes of each parallel branch; and a plurality of diodes each comprising an anode and each disposed between the node of each branch and a common feedback diode, the common feedback diode comprising an anode coupled to the anodes of the plurality of diodes and the common feedback diode coupled to provide the feedback voltage, wherein the DC voltage regulator keeps the feedback voltage from each LCD module not lower than the reference voltage independently of each module's consumption of current.

9. An IC multiple voltage supply system for LCD in claim 8, wherein the voltage supply system is in a single chip.

10. An IC voltage supply for LCD in claim 8, wherein the network of resistors is formed of parasitic resistance.

11. An IC voltage supply for LCD in claim 8, wherein the DC voltage regulator is a linear voltage regulator.

12. An IC voltage supply for LCD in claim 8, wherein the DC voltage regulator is a switching voltage regulator.

13. An IC voltage supply for LCD in claim 8, wherein the timing controller is a finite-state machine.

14. An IC voltage supply for LCD in claim 8, wherein the timing controller output has m bits, wherein m is an integer number.

15. A method of managing a voltage supply for an LCD display, comprising:

providing a DC voltage regulator;

supplying a reference voltage input signal to a first input terminal of the DC voltage regulator;

connecting a plurality of LCD modules in parallel on the output of the DC voltage regulator; and connecting a plurality of diodes each between at least one LCD module and a common feedback diode coupled to a second input terminal of the DC voltage regulator, wherein each of the plurality of diodes comprises an anode connected to an anode of the common feedback diode, wherein the diodes provide a feedback voltage input for the DC voltage regulator.

16. A method of managing a voltage supply for an LCD display as in claim 15, the reference voltage input is internally fixed.

17. A method of managing a multiple voltage supply for an LCD display, comprising:

providing a timing controller and outputting to a digital-analog-converter (DAC);

generating a plurality of reference voltage signals from the DAC;

providing a plurality of DC voltage regulators, for each DC voltage regulator:

applying one of the plurality of reference voltage signals to a first input terminal of the DC voltage regulator;

connecting a plurality of LCD modules in parallel to the output of the DC voltage regulator; and connecting a plurality of diodes each between at least one LCD module and a common feedback diode coupled to a second input terminal of the DC voltage regulator, wherein each of the plurality of diodes comprises an anode connected to an anode of the common feedback diode, and wherein the diodes provide a feedback voltage input for the DC voltage regulator.

18. A method of managing a voltage supply for an LCD display as in claim 17, wherein the timing controller is a logic state machine.

* * * * *